US006537152B2

(12) United States Patent
Seelig et al.

(10) Patent No.: US 6,537,152 B2

(45) Date of Patent: Mar. 25, 2003

(54) GAMING DEVICE HAVING AN ANIMATED FIGURE

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

(*) Notice: Subject to any disclaimer, the term of this patent is extended or adjusted under 35 U.S.C. 154(b) by 0 days.

(21) Appl. No.: 09/894,198

(22) Filed: Jun. 27, 2001

(65) Prior Publication Data

US 2002/0065131 A1 May 30, 2002

Related U.S. Application Data

(60) Provisional application No. 60/241,383, filed on Oct. 17, 2000.

(51) Int. Cl.[7] .................................................. A63F 13/00

(52) U.S. Cl. .............................. 463/30; 463/20; 463/25

(58) Field of Search .............................. 463/30, 20, 25; 446/243, 246, 247, 251

(56) References Cited

U.S. PATENT DOCUMENTS

| | | | | | |
|---|---|---|---|---|---|
| 1,257,045 | A | * | 2/1918 | Stotler | 273/141 |
| 2,486,752 | A | * | 11/1949 | Michael | 273/141 |
| 3,559,995 | A | * | 2/1971 | Steadman | 273/141 |
| 3,628,792 | A | * | 12/1971 | Frederick | 273/1 M |
| 3,994,078 | A | | 11/1976 | Liu | |
| 4,244,568 | A | * | 1/1981 | Ferris et al. | 273/1 |
| 4,799,678 | A | | 1/1989 | Terzian et al. | |
| 4,938,481 | A | * | 7/1990 | Goldfarb et al. | 273/243 |
| 5,310,190 | A | * | 5/1994 | Morris | 273/243 |
| 5,560,603 | A | * | 10/1996 | Seelig et al. | 463/6 |
| 5,584,763 | A | * | 12/1996 | Kelly et al. | 463/16 |
| 5,848,932 | A | * | 12/1998 | Adams | 463/20 |
| 5,919,088 | A | * | 7/1999 | Weiss | 463/9 |
| 6,244,959 | B1 | * | 6/2001 | Miyamoto et al. | 463/31 |
| 6,254,479 | B1 | * | 7/2001 | Okitani et al. | 463/7 |
| 6,254,481 | B1 | * | 7/2001 | Jaffe | 463/20 |
| 6,270,411 | B1 | | 8/2001 | Gura et al. | |
| 6,290,600 | B1 | | 9/2001 | Glasson | |
| 6,302,790 | B1 | * | 10/2001 | Brossard | 463/20 |
| 6,315,660 | B1 | * | 11/2001 | DeMar et al. | 463/16 |
| 6,375,570 | B1 | * | 4/2002 | Poole | 463/31 |
| 6,394,901 | B1 | * | 5/2002 | Marta | 463/20 |

OTHER PUBLICATIONS

Marshall Fey, "A Pictorial History of the First 100 Years of the World's Most Popular Coin–Operated Gaming Device," Slot Machines, 1st ed., Liberty Belle Books, p. 235, (1983, 1989, 1991, 1994). Reno/US.

* cited by examiner

*Primary Examiner*—Gene Mancene
*Assistant Examiner*—Frederick C. Nicolas
(74) *Attorney, Agent, or Firm*—Rolando J. Tong; Ian F. Burns & Associates

(57) ABSTRACT

The present invention relates to an animated gaming system and animated display system, comprising a housing, an animated figure and an animated element. The housing for the animated gaming system include having a symbol which represents a prize. The animated figure has a three-dimensional form. The animated element is operatively coupled to the animated figure and is controlled by a control system which manages the operations of the animated figure. The control system includes one or more controlled outputs which are forced to change in a desired manner as time progresses.

34 Claims, 8 Drawing Sheets

GAMING DEVICE HAVING AN ANIMATED FIGURE

CROSS REFERENCES TO RELATED APPLICATIONS

This application claims priority of U.S. provisional patent application Ser. No. 60/241,383, filed on Oct. 17, 2000.

BACKGROUND OF THE INVENTION

1. Field of Invention

The present invention relates to a gaming system and method having an animated figure. More particularly, the animated figure is a three-dimensional animated figure having a control system.

2. Description of Related Art

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Games Having Animated Characters

It is well known that games of chance such as slot machines may have an animated character which operates in conjunction with the game of chance. For example, in Slot Machines, by Marshall Fey, a slot machine called "Shoot the Bear" describes a bear which stands up and growls when a jackpot is hit.

More generally, gaming devices having animated characters are well known. For example, in U.S. Pat. No. 4,799,678, hereinafter the "'678 patent", a game device which interacts with an animated character to simulate a game show is described. More particularly, the '678 patent describes an electronic game playing device with a synthesized voice and an animated game show host character. The animated game show host character has different features such as eyes, head and arms which are activated at different times in response to synthesized voice or the output of an audio tape.

SUMMARY OF INVENTION

1. Advantages of the Invention

One of the advantages of the present invention is that it provides a gaming device having an animated figure that identifies a prize.

A further advantage of the present invention is that it provides a control system for controlling the actions of animated gaming system.

Another advantage of the present invention is that it provides a control system for controlling the actions of animated display system.

A further advantage of the present invention is that it provides a housing having at least one symbol which represents a prize.

A further advantage of the present invention is that it provides an animated gaming device that may be used as a stand-alone game.

Another advantage of the present invention is that it provides an animated gaming device which may be used in combination with another gaming device.

An additional advantage of the present invention is that the animated gaming device is engaged after a bonusing event.

Another advantage of the present invention is that it provides a housing having a plurality of prizes which are identified by the animated figure.

Yet another advantage of the present invention is that it provides a gaming device having an animated figure that requires little maintenance.

These and other advantages of the present invention may be realized by reference to other portions of the specification, claims, and abstract.

2. Brief Description of the Invention

The present invention relates to an animated gaming system and animated display system, comprising a housing, an animated figure and an animated element. The housing for the animated gaming system include having a symbol which represents a prize. The animated figure has a three-dimensional form. The animated element is operatively coupled to the animated figure and is controlled by a control system which manages the operations of the animated figure. The control system includes one or more controlled outputs which are forced to change in a desired manner as time progresses.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Figure 1A:
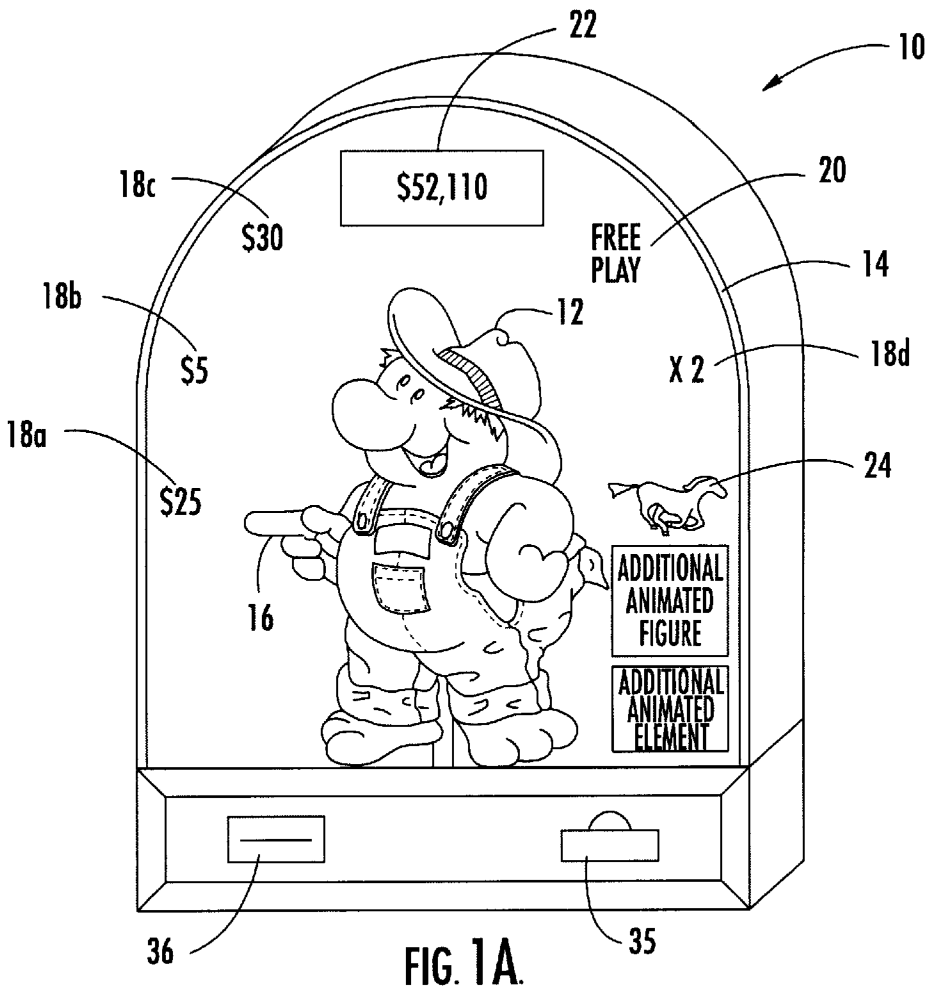
FIG. 1A is substantially a front view of a gaming device having an animated figure which identifies a first prize.

Generally, the present invention comprises an animated gaming device which is shown in FIG. 1A. The animated gaming system is indicated by reference number 10 and comprises an animated FIG. 12 which is operatively coupled to a housing 14. Preferably, the animated FIG. 12 comprises a plurality of robotic components in communication with a control system having an embedded processor. The housing 14 includes a plurality of symbols which indicate a prize awarded to a player. In operation, the movements of animated FIG. 12 is determined by the control system. In one embodiment, the animated figure identifies a prize located on the housing 14. The animated gaming system 10 may be operated as a stand-alone machine, or in combination with another gaming device. The animated gaming system 10 and the various combinations for its implementation are described in further detail below.

Animated Gaming System

Referring again to FIG. 1A, the animated gaming system 10 of the present invention includes the housing 14, the animated FIG. 12 and an animated element 16. The housing 14 includes a variety of symbols which represent a variety of prizes. By way of example and not of limitation, the symbols displayed on the housing may include numbers, letters, and various other shapes.

The prizes are represented by symbols which may represent a monetary award 18*a* through 18*d*, or additional credits 20, or a progressive networked prize 22 which is a prize created by an array of networked games, or an additional opportunity to play a game 20, or a prize which is an object 24 such as an automobile or horse. The animated FIG. 12 has a three-dimensional form which is controlled by a control system having a plurality of robotic components. The animated figure includes at least one animated element 16 which identifies or points to one or more of the symbols displayed on the housing 14.

The animated FIG. 12 may be in the form of a realistic or fictional animal. Alternatively, the animated FIG. 12 may have human features and be human-like or be in the form of a cartoon character or the like. Furthermore, the animated FIG. 12 may be a relatively simple figure which generates limited sounds and provides limited motion. Alternatively, the animated figure could be a sophisticated system having the ability to speak and to make very precise and complex movements. It shall be appreciated by those skilled in the art having the benefit of this disclosure that the description of "animated figure" includes robots which are commonly used in other industries and are commonly available in the marketplace. Such robots and the sources for these robots are described in the book entitled "Illusion of Life Lifelike Robots," by Gene William Poor, published in 1991 by Creative Learning Systems, Inc. of San Diego, Calif.

Figure 1B:
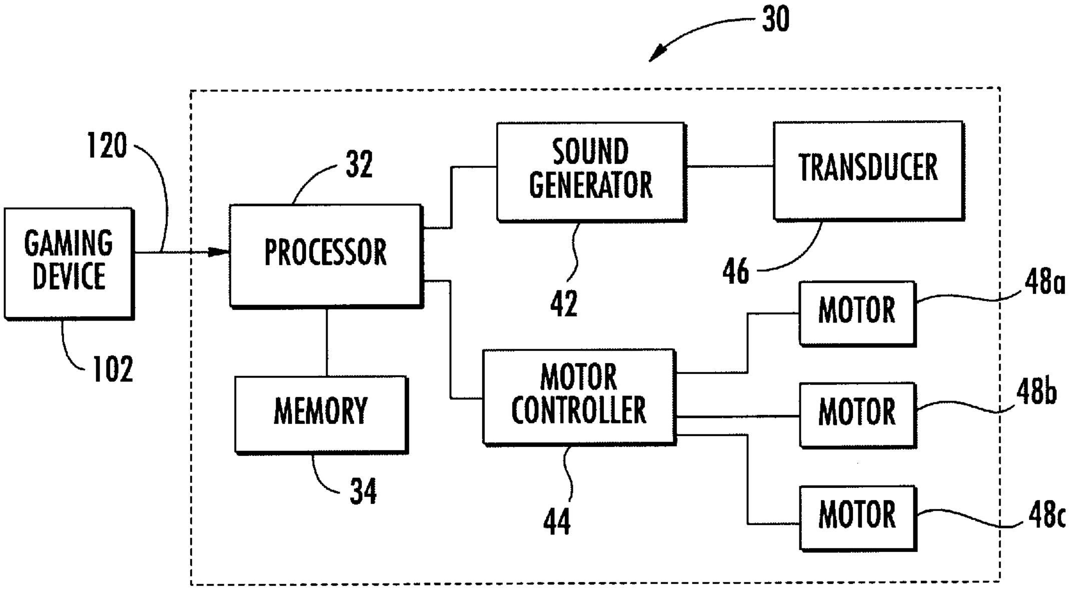
FIG. 1B is substantially a block diagram of a system for controlling the gaming device of FIG. 1A.

Referring to FIG. 1B there is shown a block diagram of the control system 30 which manages the digital signals that control the operations of the animated FIG. 12. The boundary conditions for the control system 30 are provided to teach some of the functions of the control system 30 and are not intended to restrict the method and type of control system used. By way of the example, the animated FIG. 12 is controlled by an the processor 32. Additionally, the processor 32 is configured to communicate with a memory 34. The memory may store software programs or may provide caching functionality. Although not shown flash memory, EEPROM, EPROM, ROM, SRAM, DRAM and other forms of memory may used.

In operation, the animated FIG. 12 is engaged by the insertion or transfer of a token into a token receiving component 35 which is in communication with processor 32. The token receiving component 35 may receive a variety of different tokens which may include coins, paper currency, coupons, tickets, credit cards, debit cards, electronic credits or any other such transactional medium.

In one embodiment the processor in combination with memory 34 and random number generator software are configured to generate a random number. In an alternative embodiment an integrated circuit or a ROM may be configured to generate a random number. The random number generator produces a random or pseudo random number for each game for the animated gaming system 10. The outcome of the animated gaming system 10 may be determined by comparing the random number to a table of outcomes stored in a memory and accessed by processor 32.

The random number is then used to determine the prize to be awarded according to a table. The table is also referred to as a "pay table." A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. The combination of processor 32 and memory 34 causes the animated gaming system 10 to display the outcome of the game that corresponds to the outcome of the random number generator and table. It is recognized that animated gaming system 10 may operate in many other ways and still achieve the objects of the present invention.

In the preferred embodiment a controller which is defined by the combination of a processor 32 and a memory 34 generates a random number. The processor 32 and memory 34 combination then compare the random number to a pay table similar to that described for game apparatus 20 or as described in U.S. Pat. No. 5,823,874, issued to Adams. A simple pay table may appear as follows:

| Random Number | Location Number | Amount Paid |
|---|---|---|
| 0.00 to 0.03 | 1 | $25.00 |
| 0.04 to 0.20 | 2 | 0.00 |
| 0.21 to 0.26 | 3 | $5.00 |
| 0.27 to 0.76 | 4 | 0.00 |
| 0.77 to 0.82 | 5 | $30.00 |
| 0.83 to 0.84 | 6 | Progressive |
| 0.85 to 0.89 | 7 | Free Play |
| 0.90 to 0.95 | 8 | Multiplier X2 |
| 0.96 to 1.00 | 9 | Other Symbol |

Figure 1C:
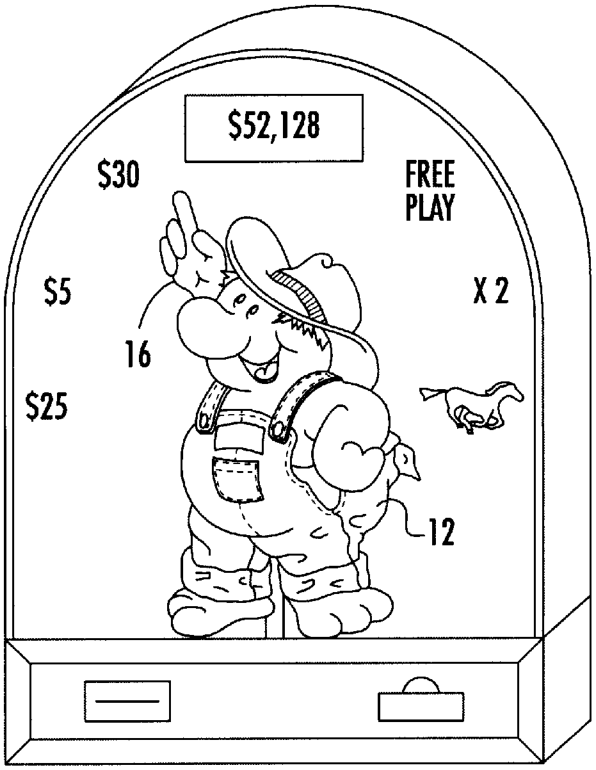
FIG. 1C is substantially a front view of the gaming device of FIG. 1A in which a first animated element is moved to identify a second prize.
Figure 1D:
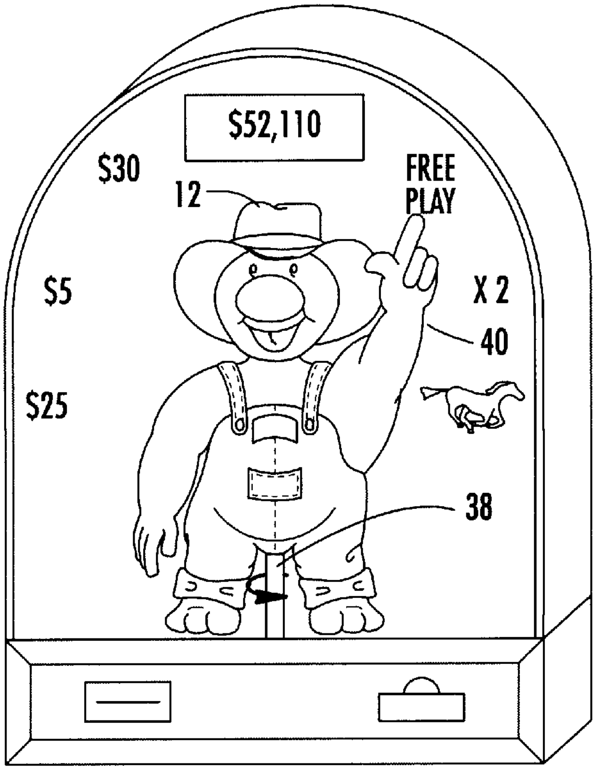
FIG. 1D is substantially a front view of the gaming device of FIG. 1A in which the animated figure is rotated and second animated element is moved to identify a third prize.

For example, if the random number generator produced 0.03 value, the animated element 16 would move to location number I which identifies the $25.00 prize as shown in FIG. 1A. Referring to FIG. 1C, if the random number generator produced a 0.45 value and the animated element is moved to location 5 according to the table above and displays the $30 prize shown. Referring to FIG. 1D, if the random number generator produced a 0.85 value, then the animated FIG. 12 is rotated about axis 38 and a second animated element 40 is moved to location 7 which identifies the "free play" prize.

The present invention is not limited to the example pay table shown. A variety of different housings 14 may be used which display a variety of prizes at a variety of different locations. For each different housing a new pay table identifying the appropriate location is loaded into the processor 32 and memory 34 combination. The housing 14 may include different kinds of prizes, besides monetary prizes, may be awarded. For example, the prizes may be goods, services, or additional games. The goods and services may be awarded in the form of physical objects, tickets, vouchers, coupons, etc. Additional games may be presented in the form of tickets, such as scratch off lottery tickets. In the embodiments in which tickets, vouchers, and coupons are used, the objects are dispensed using an internally or externally mounted dispenser 36 (see FIG. 1A). Such dispensers are well known in the art. Additionally, a coin dispenser so (nor shown) well known in the are may by used.

In an alternative embodiment, the animated gaming system includes an additional plurality of animated figures (not shown) within the same housing. The plurality of animated figures may be managed by the control system 30 described above. The plurality of animated figures may include a plurality of animated FIGS. 12 within one housing 14 wherein each of said plurality of animated figures identify a symbol which in combination with the output from each of the animated figures results in a prize.

Control System

The control system includes one or more controlled outputs which are forced to change in a desired manner as time progresses. Referring back to FIG. 1B, the animated figure includes a processor 32 in communication with a sound generator 42 and a motor controller 44. The control system 30 manages the digital signals that control the operations of the animated FIG. 12. The boundary conditions for the control system 30 describe some of the functions of the control system 30. By way of the example, the animated FIG. 12 is controlled by the processor 32 which operatively coupled to memory 34. The memory 34 provides storage for various software programs or subroutines or may provide caching functionality. Although not shown flash memory, EEPROM, EPROM, ROM, SRAM, DRAM and other forms of memory or any combination thereof may used.

The sound generator 42 provides local storage for a variety of different sounds. The variety of different sounds may be downloaded from processor 32 and memory 34 or may be pre-programmed with sounds. The sound generator communicates output signals to a transducer 46 which generates an audible output.

The motor controller 44 is configured to provide local storage for a variety of different commands which control the motors 48*a,* 48*b* and 48*c*. The motor controller may receive the commands from processor 32 or may have a plurality of commands stored locally in motor controller 44. Each of the motors 48*a,* 48*b* and 48*c* may control a plurality of electromotive or hydraulic devices for causing various movement such as the mouth or arms or other animated element of the animated figure. The animated element of animated figure includes an element of the animated figure which is subject to the control of processor 32 or motor controller 44.

In a simple illustrative embodiment, the animated FIG. 12 comprises only a portion of an animal such as the head of a figure. When the control system 30 generates the appropriate output, the mouth of the figure is moved according to the motor controller 44 and a sound is generated according to the sound generator 42.

In an more complex illustrative embodiment, the animated FIG. 12 may take the shape of a lifelike human or cartoon character capable of sophisticated movements and speech. The animated FIG. 12 may be programmed to frown or cry and then console the slot machine player upon an indication that the player did not win a prize. Alternatively, the animated figure could be programmed to jump up and down and sing or scream such statements as, "You have won," or "You are a winner" or the like. It may also be possible to have the animated figure do tricks such as somersaults or to throw candy or other safe projectiles at the slot machine player.

Method for Operating the Animated Gaming System

Figure 2A:
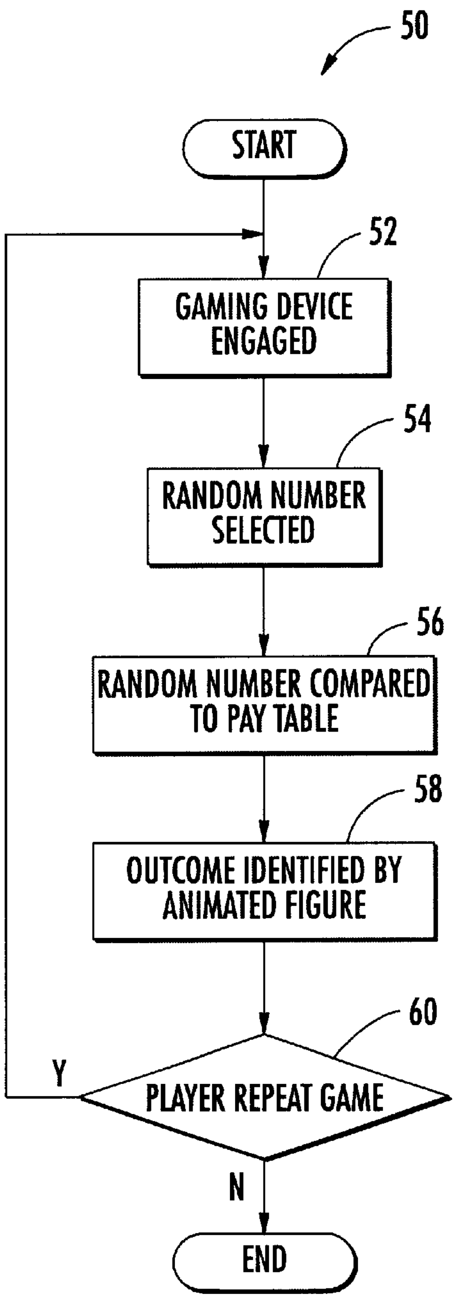
FIG. 2A is substantially a flow chart of the operation of the gaming device shown in FIG. 1A through 1B.

Referring to FIG. 2A as well as FIG. 1A there is shown a method 50 for operating the animated gaming system 10 of FIG. 1A through 1D. The method 50 for operating the animated gaming system 10 described includes the housing 14, the animated FIG. 12, and at least one animated element 16 is initiated at block 52.

At block 52, the method provides for engaging the animated gaming system 10. The animated gaming device may be engaged in a variety of methods which are described in further detail below. For illustrative purposes, the animated gaming device may be engaged by receiving a request to enable the animated gaming system 10. The request is communicated to processor 32 (see FIG. 1B). The method then proceeds to either block 54 or block 56 or block 58.

At block 54, the method then proceeds to select a random number. The random number is generated by a random number generator which is resident in a controller which comprises a processor 32 and a memory 34. Alternatively, the random number may be generated by an other gaming device which communicates the random number to the animated gaming device 10. It shall be appreciated by those skilled in the art that the use of a random number generator is well known in the art of designing gaming equipment. The method then proceeds to block 56 or block 58.

At block 56, the method provides for the comparing of the random number to a table to generate an outcome as described above. Tile outcome may be determined by another gaming device in communication with the animated gaming system 10. Preferably, the table includes a location number which is associated with a range of random numbers. The method then proceeds to block 58.

At block 58, the outcome is identified and displayed by the animated FIG. 12. Using the table identified above, the location number is communicated to the motor controller 44 and sound generator 42. The motor controller 44 and sound generator 42 generate the appropriate signals which are communicated to the motors 48*a* through 48*c* and the transducer 46, respectively. One of the motors 48*a* through 48*c* moves the animated element 16. The housing 14 has at least one symbol which represents at least one prize as described above. An animated element 16 is then used to identify the result of the outcome of the comparison in block 56. The method then proceeds to decision diamond 60.

At decision diamond 60 it is determined whether to continue the game or not. If it is decided that the game is to be continued, the method proceeds to block 52 and the animated gaming device is re-engaged. If it is decided that the game is NOT to be continued, the game is ended.

Figure 2B:
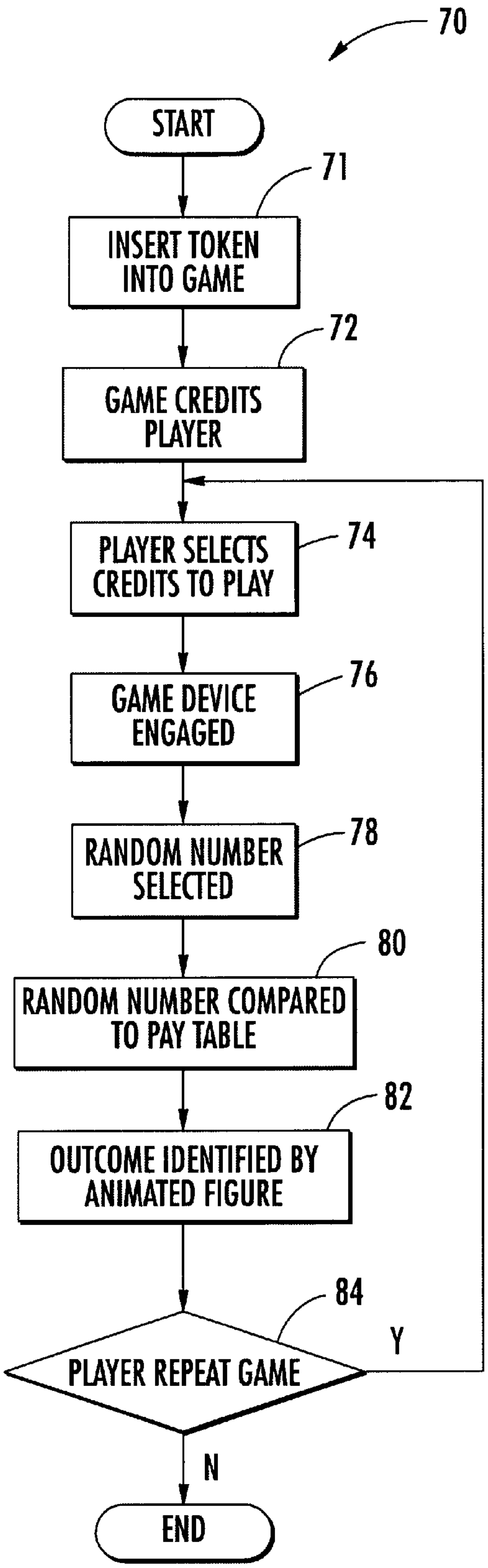
FIG. 2B is substantially a more detailed flow chart of the operation of the gaming device shown in FIG. 1A through 1B.

Referring to FIG. 2B there is shown a more detailed method 70 for engaging the animated gaming system of FIG. 2A. More particularly, attention is drawn to the blocks 71, 72 and 74 which describe the engagement of the animated gaming system described in FIG. 2A.

At block 71, the method provides for the insertion of tokens into the animated gaming system. The insertion of tokens may be physical or may be electronic. Physical tokens include coins, paper currency, coupons, tokens from magnetic stripe cards or other such devices. Electronic tokens are generated by a network, or may be generated by a storage media such as a magnetic stripe card or smart card. The tokens are communicated to a token receiving component 35 as described above. The method then proceeds to block 72.

At block 72, the method provides for the crediting of a player. The token is then converted to credits by said processor 32. The credits may be transferred or stored on the animated gaming system. The method then proceeds to block 74.

At block 74, the method provides for permitting the player to select how many credits to play on the animated gaming system. For games of chance, the credits played are used to determine the size of the payment to the player. However, it shall be appreciated by those skilled in the art that the present animated gaming system is not confined to games of chance. The method then proceeds to block 76.

Blocks 76, 78, 80, and 82 are substantially similar to the blocks 52, 54, 56 and 58, respectively. Therefore, the prior discussion of the functions performed in these steps are incorporated by reference. The method then proceeds to decision diamond 84.

At decision diamond 84 it is determined whether to continue the game or not. If it is decided that the game is to be continued, the method proceeds to block 74 and the animated gaming device is re-engaged after the player selects the credits to play. If it is decided that the game is not to be continued, the game is ended.

Gaming System

Figure 3:
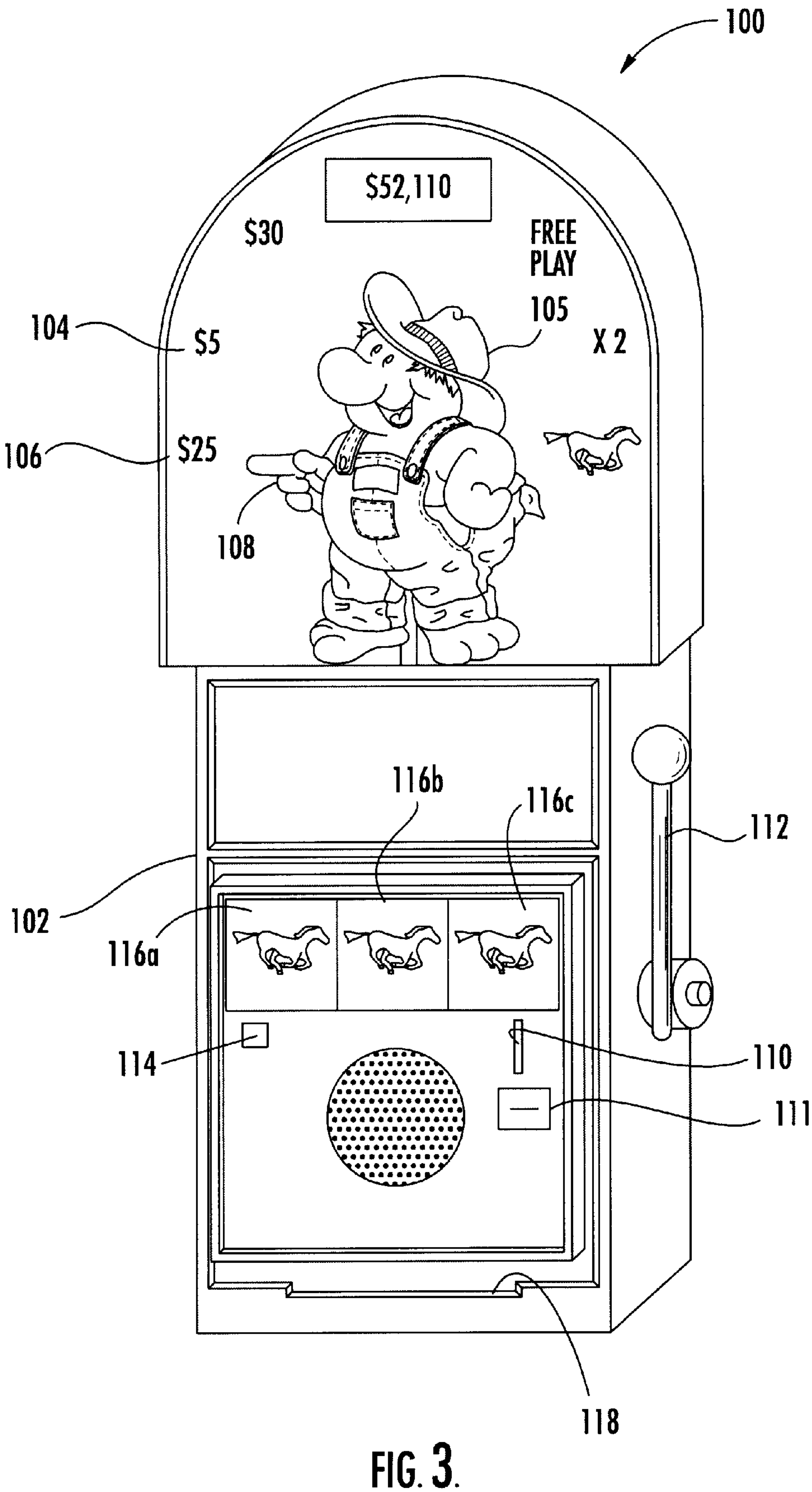
FIG. 3 is substantially a front view of a gaming system which includes a first gaming device and a second gaming device having an animated figure.

In an alternative embodiment the animated gaming system 10 is used in combination with another gaming device and this combination is referred to as gaming system 100 and is illustrated in FIG. 3. The gaming system 100 includes a first gaming device 102, an animated gaming system 104 having an animated FIG. 105 and a housing 106. The first gaming device 102 may be a traditional gaming device such as a slot machine or video game. The animated FIG. 105 has a three-dimensional form and includes an animated element 108. The animated element may be configured to identify a prize. The housing 106 houses the animated FIG. 105 which is operatively coupled to the first gaming device 102. It shall be appreciated by those skilled in the art of gaming design, that the housing 106 includes a variety of symbols which may represent a variety of prizes such as the prizes described above.

In its preferred embodiment, the first gaming device 102 is a game such as a slot machine of general conventional construction and includes a coin slot 110, a card reader 111 and a lever arm 112. Most slot machines also include a push button 114 that can be activated in order to initiate play in lieu of the lever arm 112. The first gaming device 102 also includes a window which displays spinning reels 116*a*, 116*b* and 116*c*. The first gaming device 102 may be either of the conventional mechanical type with rotating wheel or of the electronic type which simulates rotating wheels and which includes a plurality of electronic video type displays. The prizes are awarded with a coin dispenser 118 In at least one preferred embodiment, game apparatus 20 may be an S Plus model gaming device manufactured by International Game Technology in Reno, Nev.

Although the use of the slot machine is the preferred type of first gaming device 102 for the gaming system 100, it should be apparent to those skilled in the art that other types of games of chance such as poker machines, blackjack machines, keno machines and the like may also be useful. It must be understood, therefore, that the description contained herein concerning the use of a slot machine is by way of example only. In any case, regardless of the type of game of chance or gaming machine being utilized, a slot machine 102 or other gaming machine or combination thereof may be associated with the animated gaming system 104.

Referring back to FIG. 1B, an electrical output line 120 from the first gaming device 102 extends from the first gaming device 102 and is adapted to carry the output signal from the first gaming device 102 to the animated FIG. 105. This output signal is intended to be representative of a particular condition or play for the first gaming device 102. The output signal communicated from output line 120 is communicated to processor 32 which processes signals that control said transducer 46 and the motors 48*a*, 48*b* and 48*c* which control animated element 108. For example, a particular signal may appear on output line 120 indicating that a particular event has occurred such as the insertion of a unique coin or multiple coins have been played. Or a signal may represent the fact that a particular button (not shown) has been activated. In addition, an appropriate signal could appear on output line 120 indicated that the slot machine wheel have stopped and that the player did not win anything or that the wheels have stopped and that the slot machine player has won. A different signal could obviously also appear depending on the amount that has been won. As should be readily apparent, a substantial number of different signals could appear individually or in combination on the output line 120 indicating any one or more of a large number of different conditions of play of the first gaming device 102.

Preferably, the output line 120 is configured to communicate a bonus-activating event. This event may be the result of many different types of events. For example, a bonus-activating event may comprise displaying a particular symbol, such as a "bonus" symbol, or combination of symbols, such as three "horse" symbols, on reels 116*a*, 116*b*, and 116*c*. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Preferably, the gaming-device of the present invention comprises an animated FIG. 105 which is engaged by the bonusing event described above. The control system for engaging the animated figure is described in the discussion regarding the animated gaming system 10 in FIG. 1A. Additionally, the animated gaming system 102 operates in a similar manner as the animated gaming system 10 described above.

In operation, the first gaming device 102 is played and the animated gaming system 104 is activated when the bonusing event occurs. The bonusing event signal is communicated via output line 120 to the animated gaming control system. The animated element 108 is engaged and is used to identify the prize to be awarded to the player as described above.

Additionally, the animated gaming system 102 may include a combination of animated figures associated with a plurality of first gaming machines (not shown). Further still the animated gaming system 102 may be capable of directing its actions and sounds toward any one of the slot machine players. It is also within the scope of the present invention to provide a single gaming system 100 having a plurality of animated figures which respond individually or in combination based on the play of a plurality of first gaming devices.

A Method For Operating The Gaming System

Figure 4:
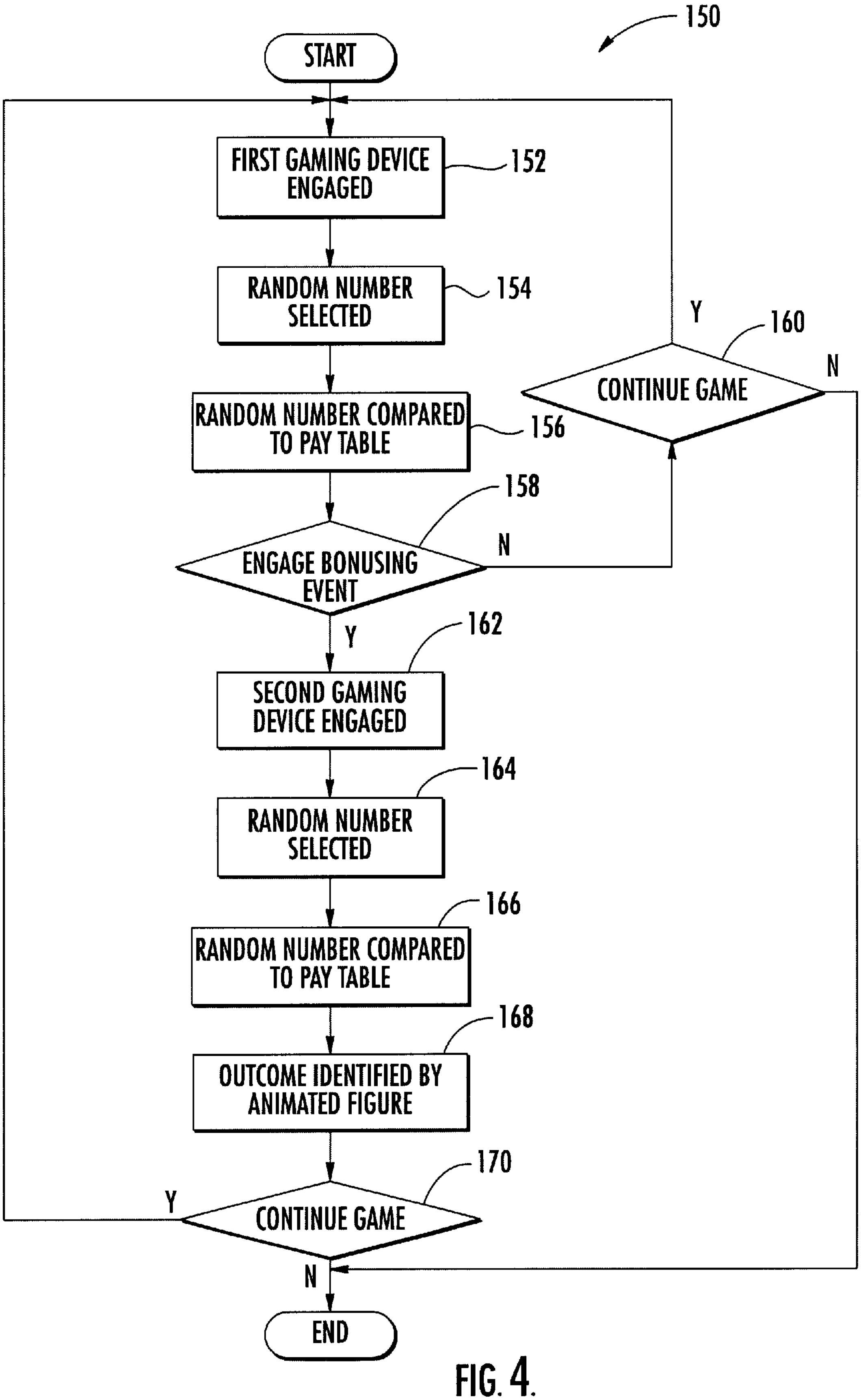
FIG. 4 is substantially a flow char of the operation of the gaming system in FIG. 3.

Referring to FIG. 4 as well as FIG. 3 and FIG. 1B there is shown a method 150 for operating the animated gaming system 100 of FIG. 3. The method 150 for operating the animated gaming system 100 described above includes providing a first gaming device 102 and providing an animated gaming system 102 having an animated element 108.

At block 152 the method provides for engaging a first gaming device 102. The first gaming device 102 may be engaged by the insertion of tokens which may be physical or may be electronic as described above. The tokens are communicated to a coin slot 110 which acts as a token receiving component. Once the token is received the player is credited and permitted to play the first gaming device 102. The player then selects the number of credits to play in the first gaming device 102. The method then proceeds to block 154.

At block 154 the method provides for selecting a random number. The random number is generated by a random number generator which is resident in a controller. It shall be appreciated by those skilled in the art that the provisioning for a random number generator is well known in the art of designing gaming equipment. The method then proceeds to block 156.

At block 156 the method provides for comparing a random number to a table as described above. It shall be appreciated by those skilled in the art that the table includes a plurality of different combinations displayed by reels 116*a*, 116*b*, and 116*c* which are associated with a range of random numbers. The method then proceeds to decision diamond 158.

At diamond 158, the bonusing event is engaged. In an illustrative embodiment, the bonusing event is engaged by the first gaming device 102. Alternatively, the bonusing event is engaged by a separate component which is in communication with said first gaming device 102. The results of the bonusing event are communicated by output line 120 to the animated gaming system 104. If the bonusing event is not engaged, the method proceeds to diamond 160. At diamond 160 the player determines whether to continue playing the first gaming device 102. If the bonusing event is engaged, the method then proceeds to block 162.

At block 162, the animated gaming system 104 is engaged according to the bonusing event communicated from output line 120 from the first gaming device 102. The animated gaming system 104 includes a housing 106 which has a variety of symbols identifying a variety of prizes. The output line 120 communicates with the animated control system having a processor 32 which controls the movements of a plurality of animated elements such as animated element 108. The method then proceeds to block 164.

At block 164, a second random number is selected. The random number is generated by a second random number generator which is resident in a controller which comprises a processor 32 and a memory 34 of the control system 30. The method then proceeds to block 166.

At block 166, the second random number is compared to a pay table as described above. Preferably, the table includes a location number which is associated with a range of random numbers. The method then proceeds to block 168.

At block 168, the outcome is identified and displayed by the animated figure. As described above, the location number is communicated to the motor controller 44 and sound generator 42 by a processor 32. The motor controller 44 and sound generator 42 generate the appropriate signals which are communicated to the motors 48*a* through 48*c* and the transducer 46, respectively. One of the motors 48*a* through 48*c* moves the animated element 108. The housing 106 has at least one symbol which represents at least one prize as described previously. An animated element 108 is then used to identify the result of the outcome of the comparison in block 166. The method then proceeds to block decision diamond 170.

At diamond 170, the player determines whether to continue playing the game. If the player decides to continue playing the game, the player is taken back to block 152 and the first gaming device is engaged. If the player decides not to continue playing the game, the game is ended.

A Gaming System Having An Animated Display

Figure 5A:
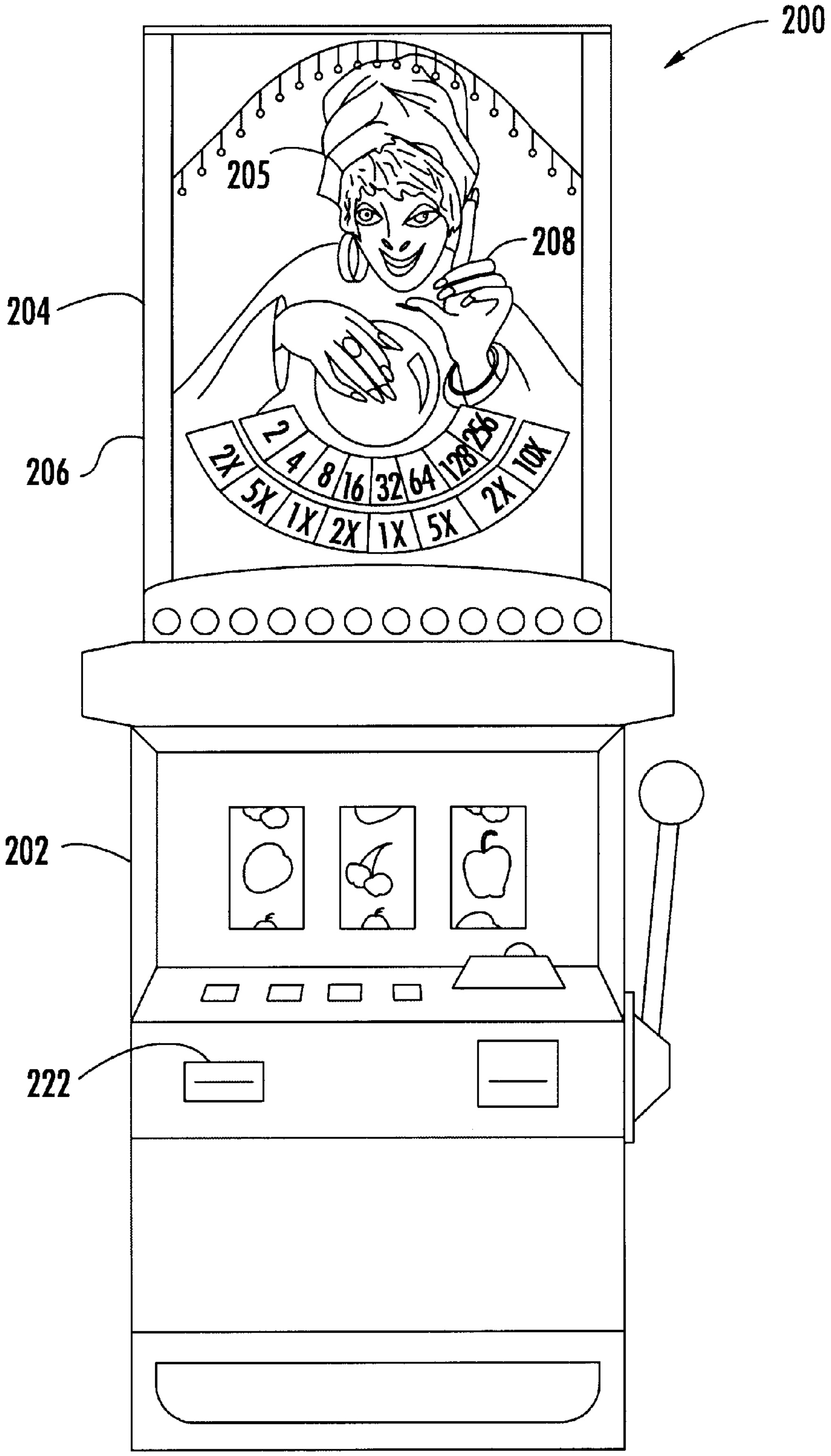
FIG. 5A is substantially a front view of a gaming system which includes a first gaming device and second gaming device having an animated figured configured to dispense a fortune.

Referring to FIG. 5A there is shown an alternative gaming system 200 which communicates the output from a game device 202 to an animated display system 204. The gaming system 200 includes an animated display system 204 which is operatively coupled to the gaming device 202. Preferably, the game device 202 is a slot machine. However, it should be apparent to those skilled in the art that other games of chance may also be configured as game device 202. These other games of chance include poker machines, blackjack machines, keno machines and the like.

The animated display system 204 includes an animated FIG. 205 and housing 206. The animated FIG. 205 includes an animated element 208 which is, preferably, configured to move along the x-axis, y-axis and z-axis. The animated figure is managed by the control system 30 described above. However, in the preferred embodiment the electrical control system 30 for the animated FIG. 205 does not employ a pay table to determine the outcome that is displayed by the animated FIG. 205. Rather it is preferable that the gaming device 202 communicates the output to the animated FIG. 205 control system 30. The animated FIG. 205 then displays the prize that was determined by the gaming device 202. By way of example, the animated figure may be configured so the animated element 208 identifies one of plurality of prizes or identifies one of plurality of bonuses.

By way of example, and not of limitation, the animated element 208 is a hand that is controlled in the x-axis, y-axis and z-axis by motors 48*a,* 48*b* and 48*c,* respectively. (See FIG. 1B). FIG. 5A shows the results of a player which has not won a prize due to the outcome of game device 202. Therefore, the animated element 208 does not identify a prize.

Figure 5B:
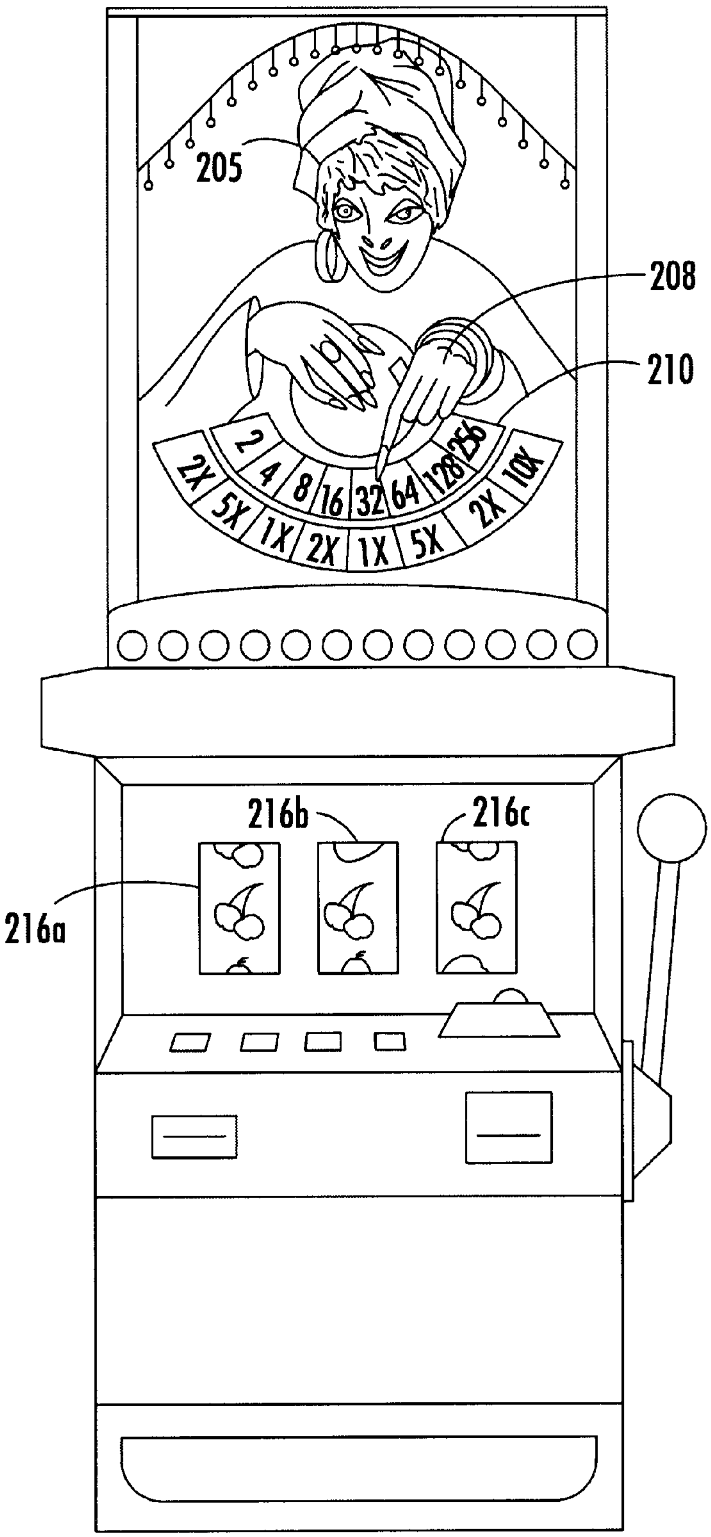
FIG. 5B is substantially a front view of the gaming system of FIG. 5A in which the animated figure identifies a first prize.

Referring to FIG. 5B there is shown one example of gaming system 200 in which the outcome has determined that player receiving a prize. The outcome is displayed by the reels 216*a,* 216*b,* and 216*c* and the prize is displayed by animated FIG. 205 and animated element 208 which identifies a prize in display window 210 which identifies 32 credits. It shall be appreciated by those skilled in the art having the benefit of this disclosure that control system 30 controls the operation of the animated element 208 which identifies the prize.

Figure 5C:
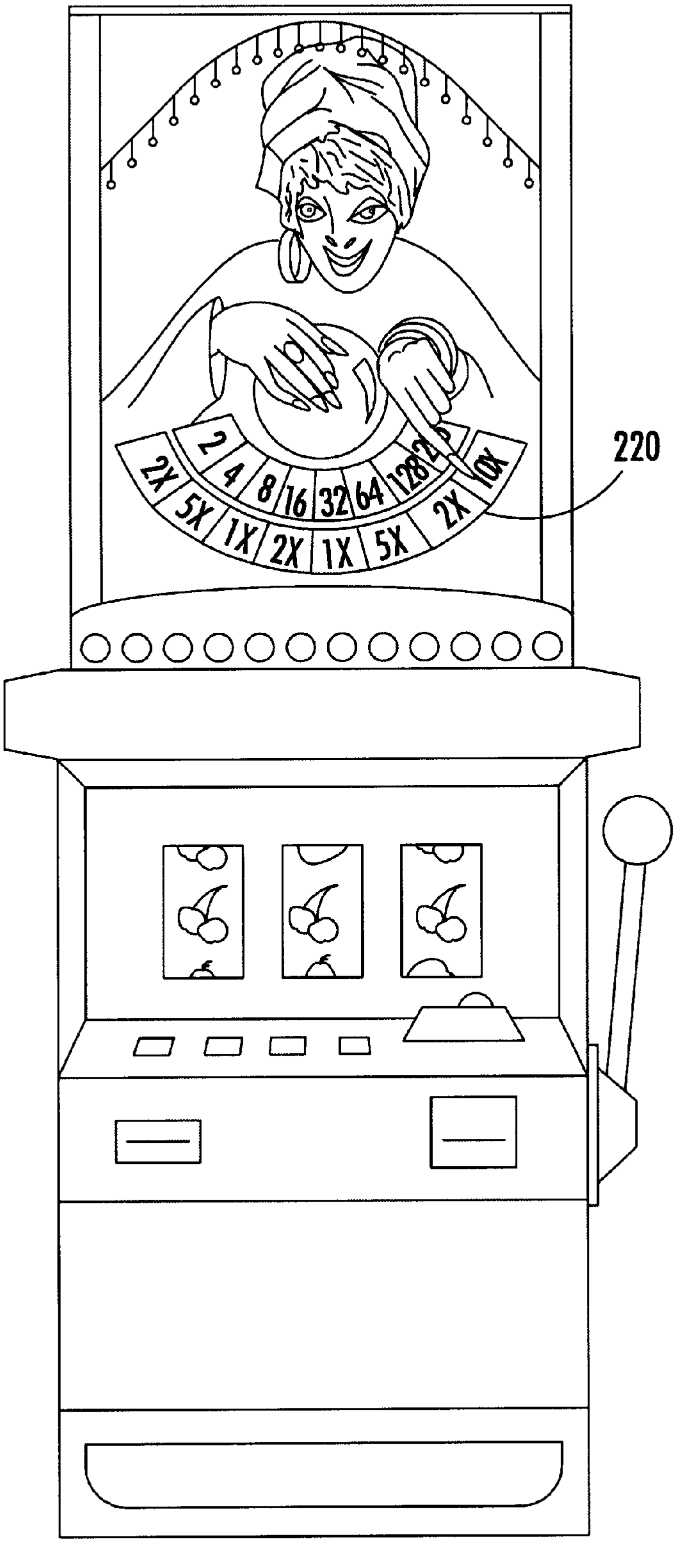
FIG. 5C is substantially a front view of the gaming system of FIG. 5B in which the animated figure identifies a second prize.

Referring to FIG. 5C there is shown another example of gaming system 200 which also provides the player with a "multiplier" prize illustrated by display component 220. The multiplier prize is based on a multiple of credits played or is a separate game which is subject to a bonus activating event. In this embodiment, the bonus activating event and the bonus prize is determined by the game device 202. Alternatively, the bonus prize may be determined by the animated display device 204 as described previously.

The method for operation of the animated gaming system 200 is the similar to the method described in FIG. 2A described above. Preferably, the pay table will be associated with the gaming device 202 and the movements of animated FIG. 205 are based on the communications from gaming device 202. Alternatively, a pay table may be resident in the control system 30 of the animated display device.

Additionally, as shown in FIG. 5A, the gaming system 200 may include a dispensing module 222 which may dispense a fortune or some other type of information.

Conclusion

It can now be seen that the present invention solves many of the problems associated with the prior art. The present invention provides a animated gaming device and animated display device which may be used as a primary game or a bonus game or in combination with a primary game. The present invention provides an animated gaming device which includes an animated figure having an animated element.

Although the description above contains many specifications, these should not be construed as limiting the scope of the invention but as merely providing illustrations of some of the presently preferred embodiments of this invention. The specification, for instance, makes reference to bonus prizes. However, the present invention is not intended to be limited to bonus prizes. Rather it is intended that the present invention can be used independently as a stand-alone game. Thus, the scope of the invention should be determined by the appended claims and their legal equivalents rather than by the examples given.

What is claimed is:

1. An animated gaming system, comprising:

a housing, the housing having at least one symbol that represents at least one prize;

an animated figure having a three-dimensional form, the animated figure being coupled to the housing;

an animated element operatively coupled to the animated figure, the animated element configured to identify the at least one prize; and a processor in communication with the animated figure, the processor being configured to generate a random number, the processor being further configured to cause the animated element to identify the at least one prize if the random number is a predetermined number or within range of predetermined numbers.

2. The animated gaining system of claim 1 wherein said at least one prize is a monetary award.

3. The animated gaming system of claim 1 wherein said at least one prize is a monetary award.

4. The animated gaming system of claim 1 wherein said at least one prize is at least one credit.

5. The animated gaming system of claim 1 wherein said at least one prize is a progressive networked prize.

6. The animated gaming system of claim 1 wherein said at least one prize is an additional opportunity to play said animated gaming system.

7. The animated gaming system of claim 1 further comprising an additional animated figure within said housing.

8. The animated gaming system of claim 1 further comprising an additional animated element within said housing.

9. The animated gaming system of claim 1 further comprising a token input component configured to receive a token and engage said animated gaming system.

10. The animated gaming system of claim 1 further comprising a processor configured to process signals that control said animated figure.

11. The animated gaming system of claim 10 further wherein said processor is configured to process signals that control said animated element.

12. A gaming system, comprising:

a first gaming device, the first gaming device being adapted to allow a player to play a game;

an animated gaming system configured to receive communications from the first gaming device, the animated gaming system including an animated figure with a three-dimensional form;

an animated element operatively coupled to the animated figure; and a processor in communication with the animated figure, the processor being configured to control the animated figure and the animated element, wherein the animated gaming system is activated by a bonus event associated with the first gaming device.

13. The gaming system of claim 12 wherein said animated element is configured to identify a prize.

14. The gaming system of claim 12 further comprising a housing configured to house said first gaming device and said animated gaming system, said housing having at least one symbol which represents a prize.

15. The gaming system of claim 12 wherein said first gaming device is a game of chance.

16. The gaming system of claim 12 wherein said first gaming device is a slot machine.

17. The gaming system of claim 12 wherein said first gaming device further comprises a first gaming device output which is communicated to said processor, said first gaming device output configured to control the engagement of said animated figure.

18. The gaming system of claim 12 wherein said animated gaming system further comprises a transducer in communication with said processor and configured to generate sounds.

19. The gaming system of claim 12 wherein said animated gaming system further comprises at least one motor controller in communication with said processor and configured to move said animated element.

20. The gaming system of claim 12 wherein said animated gaming system further comprises a plurality of first gaming devices in communication with said animated gaming system.

21. A three-dimensional animated gaming system, comprising:

a housing;

a first gaming system coupled to said housing, said first gaming system configured to generate an output;

an animated display system coupled to said housing, said animated gaming system including, an animated figure;

an animated element operatively coupled to said animated figure; and a processor configured to receive said first gaming system output and configured to control said animated element.

22. The three-dimensional animated gaming system of claim 21 wherein said first gaming system is a game of chance.

23. The three-dimensional animated gaming system of claim 21 wherein said first gaming system is a slot machine.

24. The three-dimensional animated gaming system of claim 21 wherein said animated element is configured to identify a prize.

25. The three-dimensional animated gaming system of claim 21 wherein said animated display system is engaged by a bonusing event.

26. The three-dimensional animated gaming system of claim 21 wherein said housing has a plurality of symbols which indicate a prize.

27. The three-dimensional animated gaming system of claim 26 wherein said animated element is configured to identify said prize.

28. The three-dimensional animated gaming system of claim 27 wherein said first gaming system further comprises a random number generator configured to generate a random number.

29. The three-dimensional animated gaming system of claim 28 wherein said first gaming system further comprises a pay table which in conjunction with said random number determines said prize.

30. The three-dimensional animated gaming system of claim 21 wherein said animated gaming system further comprises a fortune dispensing component configured to dispense a fortune.

31. An animated gaming system comprising:

(A) an animated figure having a three-dimensional form;

(B) at least one symbol representing at least one prize;

(C) an animated element operatively coupled to the animated figure, the animated element being configured to indicate the at least one symbol, wherein the symbol is positioned to be indicated by the animated element; and (D) a processor in communication with the animated figure, the processor being configured to generate a random number and cause the animated element to indicate the at least one symbol depending on the random number.

32. A gaming system comprising:

(A) a first gaming device, the first gaming device being adapted to allow a player to play a game, the first gaming device being configured to produce a bonus event;

(B) an animated gaming system in communication with the first gaming device, the animated gaming system comprising an animated figure with a three-dimensional form and an animated element operatively coupled to the animated figure, wherein the animated gaming system is activated when the bonus event occurs.

33. A gaming system comprising:

(A) at least one symbol;

(B) at least one three dimensional structure, the three dimensional structure being configured to move toward the at least one symbol to identify at least one prize, wherein the at least one symbol is positioned to be indiated by the three dimensional structure; pg,35

(C) a processor, the processor being in communication with the three dimensional structure, the processor being configured to cause the movement of the three dimensional structure according to a random event.

34. A gaming system comprising:

(A) a gaming device having a set of symbols that displays a game outcome, the gaming device being configured to allow a player to play a game and obtain a game outcome; and (B) a display device having at least one symbol representing a bonus prize and a three dimensional structure, the display device being configured to be activated by a bonus signal from the gaming device, wherein the gaming device sends the bonus signal to the display device upon a bonus event and the three dimensional structure is configured to identify the at least one symbol.

* * * * *

US006537152C1

(12) EX PARTE REEXAMINATION CERTIFICATE (6266th)

United States Patent

Seelig et al.

(10) Number: US 6,537,152 C1

(45) Certificate Issued: Jun. 17, 2008

(54) GAMING DEVICE HAVING AN ANIMATED FIGURE

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

Reexamination Request:
No. 90/006,865, Nov. 14, 2003

Reexamination Certificate for:
Patent No.: 6,537,152
Issued: Mar. 25, 2003
Appl. No.: 09/894,198
Filed: Jun. 27, 2001

Related U.S. Application Data

(60) Provisional application No. 60/241,383, filed on Oct. 17, 2000.

(51) Int. Cl.
*A63F 9/24* (2006.01)
*A63F 3/00* (2006.01)
*A63F 13/00* (2006.01)
*G07F 17/32* (2006.01)
*A63H 3/00* (2006.01)
*A63H 3/48* (2006.01)

(52) U.S. Cl. .............................. 463/30; 463/20; 463/25

(58) Field of Classification Search ....................... None
See application file for complete search history.

(56) References Cited

U.S. PATENT DOCUMENTS

| | | | | | |
|---|---|---|---|---|---|
| 88,756 | A | * | 4/1869 | Trump | 273/161 |
| 468,338 | A | * | 2/1892 | Goodson | 273/161 |
| 507,768 | A | * | 10/1893 | Waldman | 194/244 |
| 1,093,577 | A | * | 4/1914 | Palmer | 273/161 |
| 1,398,462 | A | * | 11/1921 | Knowles | 273/161 |
| 1,599,156 | A | * | 9/1926 | Wilnin et al. | 434/167 |
| 2,368,088 | A | * | 1/1945 | Brewer | 273/161 |
| 2,508,146 | A | * | 5/1950 | D Elia | 273/441 |
| 3,650,065 | A | * | 3/1972 | Johmann | 446/354 |
| 3,684,291 | A | * | 8/1972 | Johmann | 273/145 R |
| 3,705,726 | A | * | 12/1972 | Johmann | 273/141 A |
| 3,815,912 | A | | 6/1974 | Wichinsky et al. | |
| 5,851,148 | A | * | 12/1998 | Brune et al. | 463/25 |
| 6,315,660 | B1 | | 11/2001 | DeMar et al. | |
| 6,336,863 | B1 | * | 1/2002 | Baerlocher et al. | 463/27 |
| 6,394,898 | B1 | | 5/2002 | Nagao et al. | |
| 2002/0160826 | A1 | * | 10/2002 | Gomez et al. | 463/16 |

FOREIGN PATENT DOCUMENTS

| | | | |
|---|---|---|---|
| GB | 2201821 | | 9/1987 |
| JP | 09-108431 | * | 4/1997 |
| WO | WO 98/14251 | * | 4/1998 |

OTHER PUBLICATIONS

Fey, Slot Machines, A Pictorial History of the First 100 Years, Libert Belle Books, 1983, pp. 14, 24, 148, 160 & 161.*

Halas et al., The Technique of Film Animation, 1976, Focal Press Limited, p. 11.*

"Empire: A.C. Coin and Slot", Strictly Slots, Dec. 1998, p. 40, Casino Publishing Group, Pleasantville, New Jersey.

"Jungle King: A.C. Coin and Slot", Strictly Slots, Mar. 1999, p. 41, Casino Publishing Group, Pleasantville, New Jersey.

* cited by examiner

*Primary Examiner*—David O. Reip

(57) ABSTRACT

The present invention relates to an animated gaming system and animated display system, comprising a housing, an animated figure and an animated element. The housing for the animated gaming system include having a symbol which represents a prize. The animated figure has a three-dimensional form. The animated element is operatively coupled to the animated figure and is controlled by a control system which manages the operations of the animated figure. The control system includes one or more controlled outputs which are forced to change in a desired manner as time progresses.

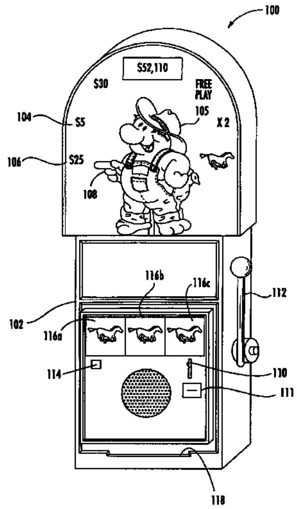

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–34 are cancelled.

* * * * *